United States Patent
Lyons et al.

(10) Patent No.: US 8,560,484 B2
(45) Date of Patent: Oct. 15, 2013

(54) USER MODEL CREATION

(75) Inventors: Kenton M. Lyons, Santa Clara, CA (US); Barbara Rosario, Berkeley, CA (US); Trevor Pering, San Francisco, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 12/972,086

(22) Filed: Dec. 17, 2010

(65) Prior Publication Data

US 2012/0158390 A1 Jun. 21, 2012

(51) Int. Cl.
G06F 17/00 (2006.01)
G06N 5/02 (2006.01)

(52) U.S. Cl.
USPC .......................................................... 706/48

(58) Field of Classification Search
None
See application file for complete search history.

(56) References Cited

U.S. PATENT DOCUMENTS

| | | | |
|---|---|---|---|
| 7,337,466 B2 * | 2/2008 | Light et al. | 726/2 |
| 7,483,952 B2 * | 1/2009 | Light et al. | 709/207 |
| 7,606,392 B2 * | 10/2009 | Gordon et al. | 382/103 |
| 8,117,284 B2 * | 2/2012 | Light et al. | 709/219 |
| 2007/0208730 A1 | 9/2007 | Agichtein et al. | |
| 2010/0046842 A1 | 2/2010 | Conwell | |
| 2010/0083217 A1 * | 4/2010 | Dalal et al. | 717/106 |

FOREIGN PATENT DOCUMENTS

| KR | 10-2008-0082964 A | 9/2008 |
|---|---|---|
| KR | 10-2009-0043128 A | 5/2009 |
| KR | 10-2009-0078695 A | 7/2009 |

OTHER PUBLICATIONS

International Search Report and Written Opinion Received for PCT Application No. PCT/US2011/61789, mailed on Jul. 31, 2012, 9 pages.

* cited by examiner

*Primary Examiner* — Michael B Holmes
(74) *Attorney, Agent, or Firm* — Caven & Aghevli LLC

(57) ABSTRACT

In some embodiments a controller is adapted to receive textual representation of content experienced by a user, to receive information about an interaction by the user with the content, and to determine a user model in response to the textual representation and the interaction. Other embodiments are described and claimed.

20 Claims, 2 Drawing Sheets

USER MODEL CREATION

TECHNICAL FIELD

The inventions generally relate to user model creation.

BACKGROUND

Modeling of content is currently performed at a very coarse level. For example, content modeling currently is performed based on the web page that a user loaded, for example. Some video devices track fine grained navigation, but it is only coarsely linked to the specific content that is being accessed. For example, Tivo tracks fast forward and reverse choices and ties that to the portions of ads or shows that are watched or skipped, but there are no deeper semantics. Similarly, some email programs track the emails that were accessed in order to support prioritization, but do not track which portions of those emails being accessed.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to user model creation.

In some embodiments a controller is adapted to receive textual representation of content experienced by a user, to receive information about an interaction by the user with the content, and to determine a user model in response to the textual representation and the interaction.

Figure 1:
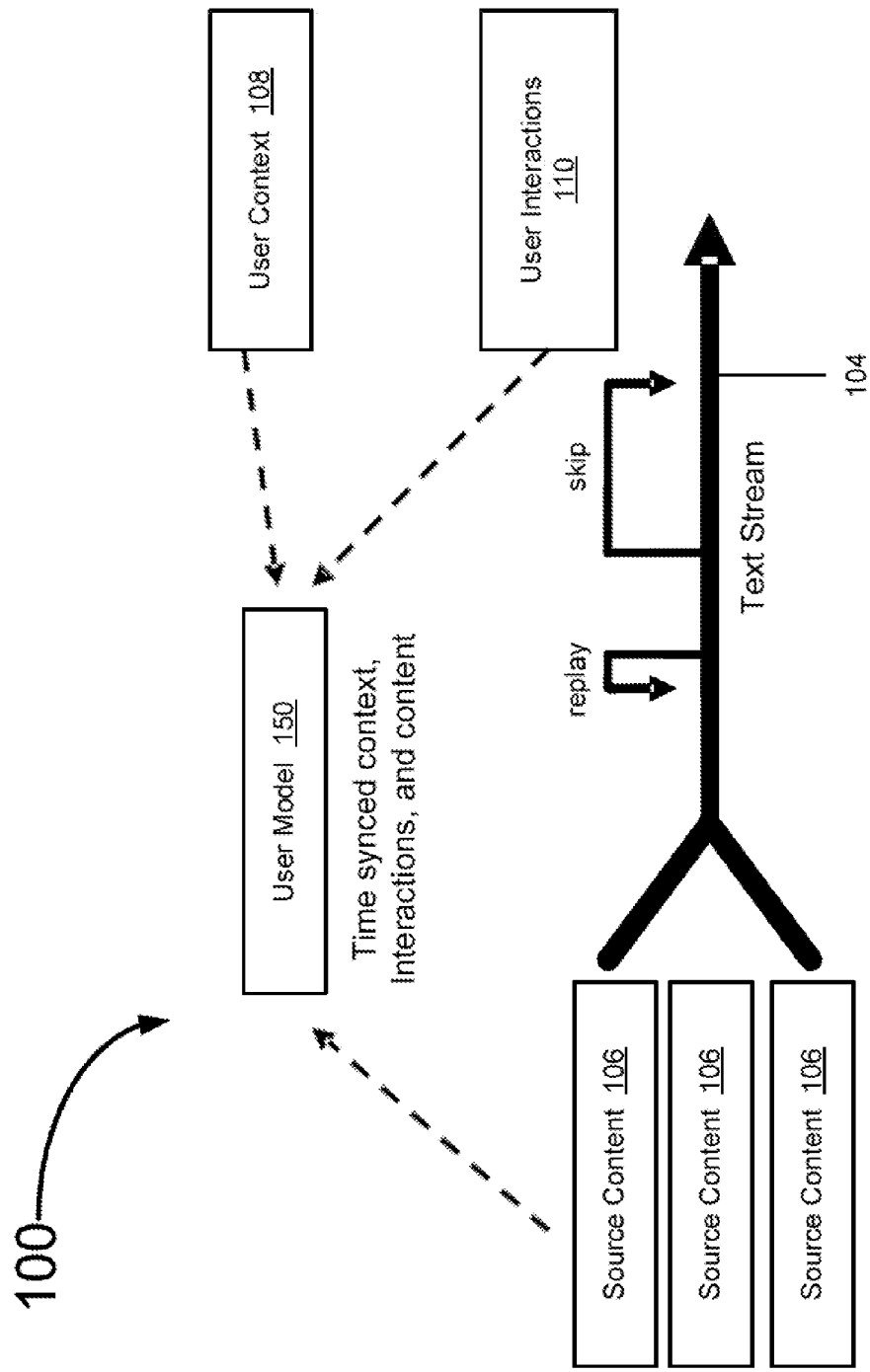
FIG. 1 illustrates a system according to some embodiments of the inventions.

FIG. 1 illustrates a system 100 according to some embodiments. In some embodiments system 100 includes a text stream 104, one or more items of source content 106, user context 108, user interactions 110 and a user model 150. In some embodiments in response to the text stream 104, source content 106, user context 108 and/or user interactions 110 the user model 150 is formed. In some embodiments the formation of the user model 150 is in response to one or more additional items (input) in addition to or instead of the elements illustrated in FIG. 1. In some embodiments, user model 150 is determined using software. In some embodiments, user model 150 is determined using hardware. In some embodiments, the user context 108 and/or user interactions 110 are determined in response to various items input from or determined based on a user. For example, in some embodiments, the user interactions 110 are responsive to user input (for example, if a user requests to skip ahead in the text stream 104 and/or to replay a portion of the text stream 104). In some embodiments, user model 150 is determined based on, for example, time synced context, interactions, and content.

Figure 2:
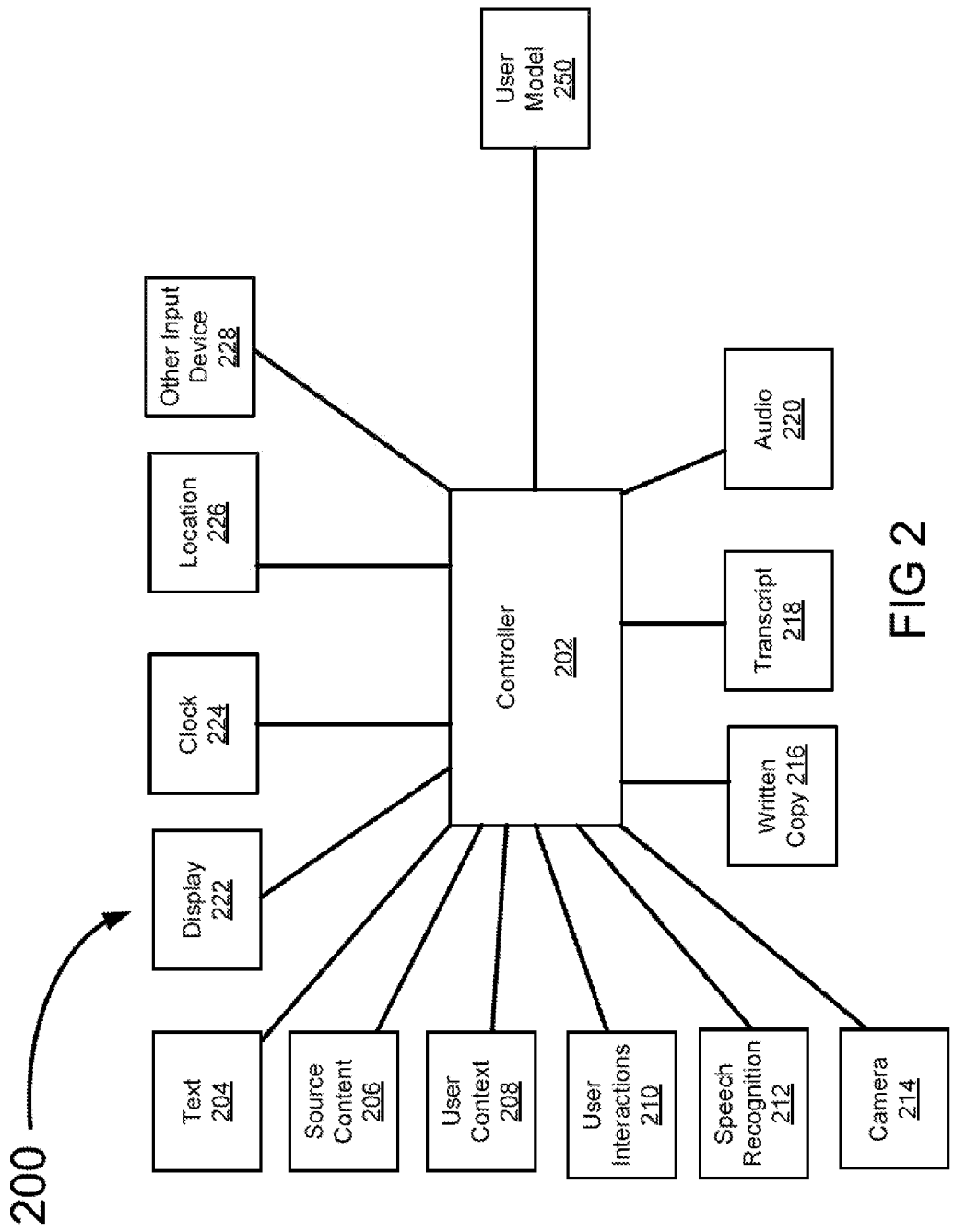
FIG. 2 illustrates a system according to some embodiments of the inventions.

FIG. 2 illustrates a system 200 according to some embodiments. In some embodiments, system 200 includes a controller (for example, a processor and/or software) 202 and several input devices. In some embodiments controller 202 includes software running on a processor. In some embodiments the input devices include devices for providing to the controller 202 text 204, source content 206, user context 208, user interactions 210, speech recognition 212, a camera 214, written copy 216, a transcript 218, audio 220, a display 222, a clock 224, a location 226 (for example, a Global Positioning System or GPS location), and/or some other type of input device 228. Controller 202 (and/or software) determines a user model 250 in response to signals received from one or more of these input devices 204, 206, 208, 210, 212, 214, 216, 218, 220, 222, 224, 226, and/or 228. It is noted that FIG. 2 illustrates each of the input devices separately and directly coupled to controller 202. However, in some embodiments the input devices may be coupled using a common bus such as an Input/Output (I/O) bus or some other type of bus. In some embodiments, controller 202 may be located in a computer and/or may be the main processor of a computer. In some embodiments controller 202 may be or may be included in a chip set of a processor (for example, in a Platform Controller Hub or PCH, an I/O Controller Hub or ICH, etc.)

Tracking and/or modeling of the content a user has consumed is useful to determine a user model that may be used in personalization, filtering, recommendations, advertising, etc. relating to the experience of a user in a content environment. In some embodiments, textual representation of source material content is utilized to create the user model of consumed information (for example, original text, a transcript of audio, etc.). In some embodiments, information obtained from user interactions is used to create the user model of consumed information.

Some display mechanisms are transient in nature (for example, with text tickers, audio, etc.) In these environments, in addition to tracking which overall document was accessed, it is possible according to some embodiments to log and utilize specific portions of the accessed document. Additionally, interactive displays that allow the user to skip, replay, and/or otherwise navigate portions of the content information provide an even, finer level of detail of content access for modeling. For example, according to some embodiments an audio system that plays news stories to a user. On one level, the system models which stories might be of interest to the user and can use this as a way to prioritize and/or filter the information. On another level, by tracking interactions while the content is played, the system gains insights as to which specific pieces of content the user heard, wanted to replay, or skipped, for example. In some embodiments, by correlating this navigation information with the underlying content (such as the textual copy of a news story) the system creates a more detailed model about specific items that may be relevant to a user.

Some embodiments relate to traditional visual displays. For example, in a web scenario in which a user loads a document, in addition to tracking which document was loaded the system tracks the portions of the document that are visible and which portions are off-screen (and/or scrolling interactions), if the window is in focus or if it is in the background, which regions are covered and which remain visible, which portions of text are highlighted or moused over by the user, etc. According to some embodiments, one or more (or all) of these interactions are correlated with a corresponding source text in order to help determine the user model.

According to some embodiments, a system tracks user input of content for the purposes of user modeling. According to some embodiments, a computer, a processor, software, and/or a computer based mechanism are used to render textual content to a user (for example, via a visual display, a speech synthesizer, and/or a audio system, etc.) In some embodiments, interactive components enable the user to navigate through source material at both a course level (for example, from news story to news story) and at more fine grained levels (for example, sections, paragraphs, a particular sentence and/or a particular word, etc.) Interactions are tracked and correlating to the underlying content being provided to the user. For example, in some embodiments, this is original text of a web page, written copy of a news story, a transcript derived through automatic speech recognition that is time aligned at a word level with the audio, etc.

According to some embodiments, the user model is enhanced using additional information derived from the contextual state of the user when a particular section of text (for example, a paragraph, sentence, and/or word) has been read. For example, according to some embodiments a camera looking at a user determines basic facial expressions such as, for example, is the user interested, disinterested, happy, sad, confused, distracted, etc. In some embodiments, knowledge of location is used as a factor (for example, did the person choose to read the particular text at work, at home, on the go on a smart phone, etc. In some embodiments, time is used as an input to the user model (for example, the system captures generic times such as evening hours, work hours, weekend, vacation time or other types of time as determined based on a calendar of the user, etc. According to some embodiments, many different sources of input information are provided to inform and help determine the particular user model (for example, such as figuring out what a user does with their spare time or at work, etc). According to some embodiments, a user model is trained based on inputs such as interaction, context, and/or source content.

As discussed above, modeling of content is currently performed at a very coarse level. For example, content modeling currently is performed based on the web page that a user loaded, for example. Some video devices track fine grained navigation, but it is only coarsely linked to the specific content that is being accessed. For example, Tivo tracks fast forward and reverse choices and ties that to the portions of ads or shows that are watched or skipped, but there are no deeper semantics. Similarly, some email programs track the emails that were accessed in order to support prioritization, but do not track which portions of those emails being accessed. According to some embodiments, however, material having a textual representation is used, allowing a modeling at a much finer grained semantic level than what has previously been possible. Additionally, according to some embodiments, user interactions are used in order to maintain more detailed information about content use. According to some embodiments, secure and anonymous tracking and sharing are implemented, and such user models are shared with content providers in order to enrich the experience of the user.

Although some embodiments have been described herein as being implemented in a particular manner, according to some embodiments these particular implementations may not be required.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computer-based method to determine a user model, comprising:
    presenting source material content to a user;
    converting at least a portion of the source material content to a textual representation of the source material content;
    tracking an interaction by the user in response to the source material content;
    correlating the interactions with the textual representation of the source material content; and
    determining a user model in response to the textual representation and the interaction.

2. The method of claim 1, further comprising tracking the interactions and correlating them with the source material content.

3. The method of claim 1, wherein the textual representation is text of a web page viewed by a user, written copy of a news story, a transcript, a transcript derived through speech recognition, and/or a transcript derived through speech recognition that is time aligned at a word level with audio.

4. The method of claim 1, further comprising receiving a user context and determining the user model in response to the user context.

5. The method of claim 4, wherein the user context is a contextual state of the user at a time when a particular portion of the content is being experienced.

6. The method of claim 5, wherein the user context is a contextual state of the user at a time when a particular portion of text is being read by the user.

7. The method of claim 6, wherein the particular portion of text is a particular paragraph, a particular sentence, and/or a particular word.

8. The method of claim 1, further comprising determining facial expressions of the user while the user is experiencing the content and determining the user model in response to the determined facial expressions.

9. The method of claim 1, further comprising determining a location of the user while the user is experiencing the content and determining the user model in response to the determined location.

10. The method of claim 1, further comprising determining a time that the user is experiencing the content and determining the user model in response to the determined time.

11. A computer based system to determine a user model, comprising:
    a controller adapted to:
    present source material content to a user;
    convert at least a portion of the source material content to a textual representation of the source material content;
    track an interaction by the user in response to the source material content;
    correlating the interactions with the textual representation of the source material content; and
    determine a user model in response to the textual representation and the interaction.

12. The system of claim 11, the controller further adapted to track the interactions and correlate them with the source material content.

13. The system of claim 11, wherein the textual representation is text of a web page viewed by a user, written copy of a news story, a transcript, a transcript derived through speech recognition, and/or a transcript derived through speech recognition that is time aligned at a word level with audio.

14. The system of claim 11, the controller further adapted to receive a user context and determining the user model in response to the user context.

15. The system of claim 14, wherein the user context is a contextual state of the user at a time when a particular portion of the content is being experienced.

16. The system of claim 15, wherein the user context is a contextual state of the user at a time when a particular portion of text is being read by the user.

17. The system of claim 16, wherein the particular portion of text is a particular paragraph, a particular sentence, and/or a particular word.

18. The system of claim 11, further comprising a camera adapted to capture facial expressions of the user while the user is experiencing the content, the controller adapted to determine the user model in response to the captured facial expressions.

19. The system of claim 11, further comprising a locator adapted to determine a location of the user while the user is experiencing the content, the controller adapted to determine the user model in response to the determined location.

20. The system of claim 11, further comprising a clock adapted to determine a time that the user is experiencing the content, the controller adapted to determine the user model in response to the determined time.

* * * * *